Jan. 19, 1965

T. C. WALDROP 3,166,334

MULTIPLE ELEMENT SWAB

Filed June 27, 1963

INVENTOR.
THOMAS C. WALDROP
BY Alexander & Dowell
ATTORNEYS 3,166,334
MULTIPLE ELEMENT SWAB
Thomas C. Waldrop, Arlington, Tex., assignor to Empire
 Rubber Company, Grapevine, Tex., a corporation of
 Texas
Filed June 27, 1963, Ser. No. 291,151
6 Claims. (Cl. 277—208)

This invention relates to swab structures of the type used to swab pipe, tubing, or casing, for instance in wells or pipelines, and more particularly this invention relates to improvements in multiple-element elastomeric swabs.

It is a principal object of this invention to provide an improved multiple-element swab in which the shape and proportions of the swab have been improved to provide a structure capable of efficient sealing, while at the same time distributing the frictional wear over a relatively large area even when the swab is relatively lightly loaded.

The prior art contains many teachings of multiple-element swabs, generally of a type which includes a plurality of swabbing elements each of which is quite short as measured in the axial direction and as compared with its diameter. Moreover, the prior art also teaches the combination of these axially-short elements alternately interspersed with axially longer sealing elements. One difficulty with such prior-art swabs is that the axially-short swabbing elements tend to fail prematurely by tearing off a sector of the lip portion, which portion then drops onto the next-lower sealing element, already under tremendous lifting pressure, and jams between the next-lower element and the pipe wall, thereby causing damage to this heavily-loaded element. Prior-art swabs recovered from the wells frequently show this type of failure, but the present novel structure excludes short elements, and includes only axially longer and much tougher elements.

The reason why most prior art swabs include a series of relatively short swabbing elements is that in most prior art structures the initial seal between the swab and the pipe in which it is operating is accomplished by downward deflection of the entire short-swabbing element which is constructed in the form of a radially extending rib so that it will under pressure, move outwardly and contact the pipe walls. In some cases, another annular element is disposed just below such an axially-short swabbing element to provide backing therebeneath which can provide support for the sealing rib to oppose its downward deflection beyond the point at which it makes contact with the pipe walls.

It is an important object of this invention to provide a different approach to the problem of initial sealing by providing a series of axially-long swab elements which are outwardly and upwardly flared to within a few thousandths of an inch of the pipe wall. Practical field tests have shown that a relatively long swabbing element performs in a very satisfactory manner if tapered at an angle lying approximately within the range of about ½–3 degrees with respect to the axis of the swab. If the angle is reduced substantially below ½ degree so that the side walls of the swab elements are virtually cylindrical, it becomes difficult to have close enough spacing between the upper lip of the swabbing element and the pipe wall so as to provide initial sealing at reasonably low pressures while, at the same time, provide sufficient clearance between the side walls of the sealing element and the pipe so that the swab can be made to travel downwardly in the pipe without dragging excessively against the pipe. It is to be understood that "upward direction" refers to movements of the swab in the axial direction which causes sealing of the swab elements against the pipe walls, and "downward direction" refers to axial movements of the swab in a direction which opposes sealing of the swab against the wall. In other words, the present invention is not to be limited to vertical-axis orientation.

On the other hand, if the flare angle is made too great, substantially in excess of about three degrees with respect to the axis of the swab, there is the tendency for the upper lip of the swabbing element to be inadequately supported by the rest of the body element. It is considered very important that as much of the wall surface of the swab elements be in contact with the walls of the pipe being swabbed as possible, whereby the wear is distributed over as much area as possible rather than being concentrated in the vicinity of the upper lip of the swabbing element. It is intended that considerable internal rubber flow shall occur during upward motion of the swabbing element so that the rubber nearest the lower end of the swabbing element will also move out into contact with the pipe walls. In other words, the downward pressure should cause axial shortening of the swabbing element together with radial expansion thereof along as much of the side wall of the element as possible. It has been found that frustoconical side walls which make angles up to about three degrees with respect to the axis of the swab will be spread into contact with the pipe walls over almost their entire length, especially where the swabbing elements are made of rubbers of durometer hardness lying within a suitable range, specifically 45 to 65 durometer. Thus, not only the angle of the side wall affects the pressure at which the full length of the side wall will contact the tubing, but there is, of course, a relationship between the angle of the frusto-conical walls of swab elements and the viscosity of the rubber used therein which affects optimum sealing of the elements against the pipe.

It is desirable to have a relatively long swab structure including at least two, and probably more, swabbing elements. If a swab of the length of three of the present elements were made as a continuous single very long swabbing element, and if its walls were frusto-conical and flared at an angle within the above-mentioned range, then the difference in diameter between the uppermost lip and the lower end of the swab element would be much too great. Therefore, the present invention interrupts the frustoconical side walls at certain intervals which permits the upper lip located below each interruption to be moved back out to the largest permissible diameter. Thus, interruption by providing spaced annular grooves in the frusto-conical walls creates plural sealing lips and prevents too large a difference in diameters between the top and bottom of each swabbing element.

It is another object of the invention to provide satisfactory angles for the upper and lower walls of each groove. The angle of the lower wall in each groove determines whether the upper end of the swabbing element comprises a cup, or is cut squarely off. It is believed desirable that this angle range from 75 and 90 degrees with respect to the axis of the swab. On the other hand, it is desirable that the angle of the upper wall of the groove be such that when the rubber is flowed downwardly toward this surface by fluid pressure above the swab element, there should be a tendency to press the flowed rubber outwardly. This occurs in a satisfactory manner if the angle of the upper surface of each groove lies between 45 and 60 degrees. The depth of the groove also has an effect upon the tendency of the rubber to flow independently in the individual sealing elements.

Other objects and advantages of the invention will become apparent during the following discussion of the drawing, wherein.

Figures 1, 2, 3, 4:
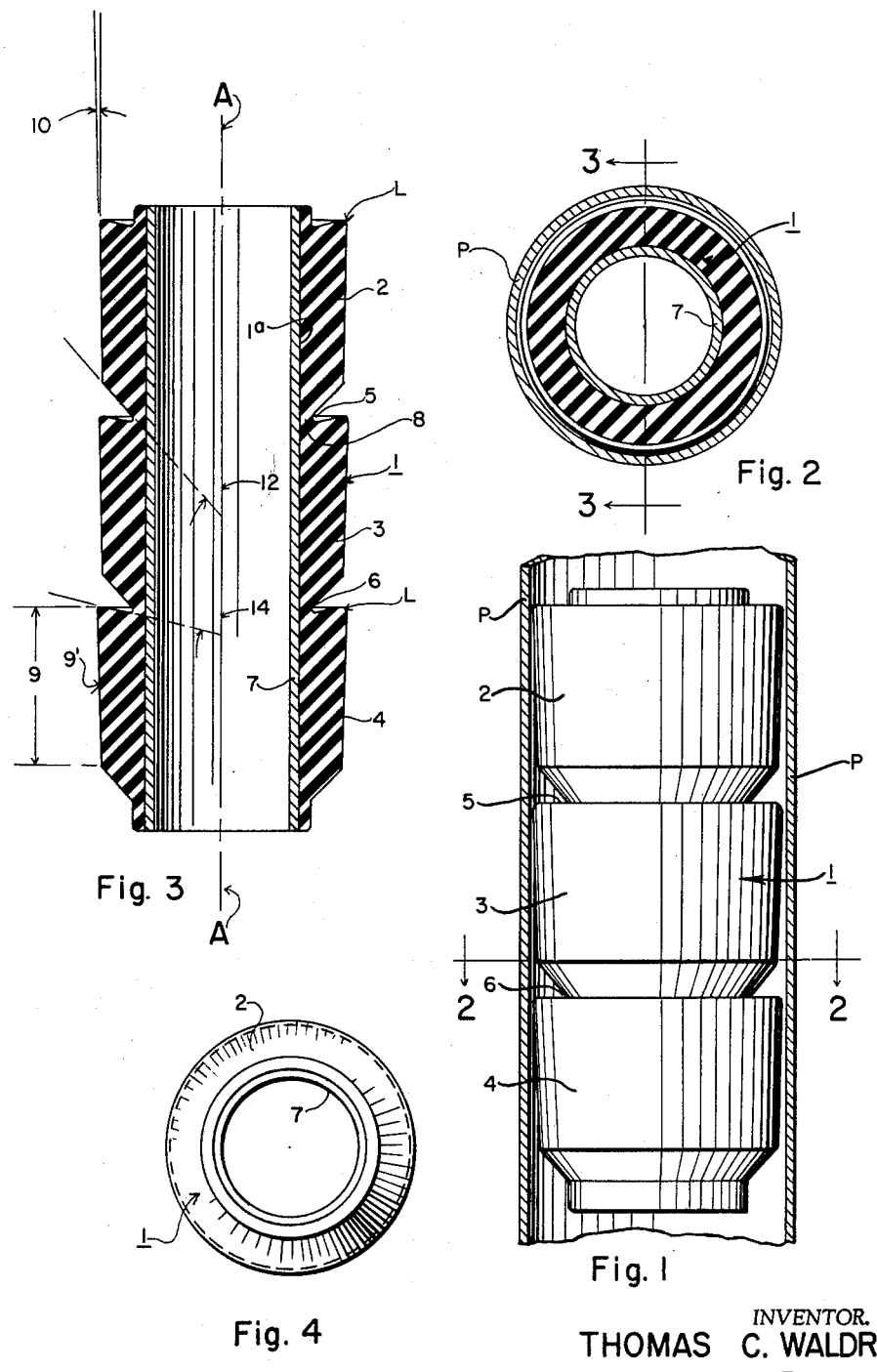
FIG. 1 is an elevation view of a three-element swab structure according to the present invention shown inside a length of pipe broken away to show the swab.
FIG. 2 is a cross-sectional view taken along line 2—2 of FIG. 1.
FIG. 3 is a cross-sectional view taken along line 3—3 of FIG. 2.
FIG. 4 is a plan view of the swab.

Referring now to the drawing, FIG. 1 shows a swab 1 located within a pipe P which is shown in cross-section so that the swab can be clearly seen. The swab itself includes three swabbing elements, 2, 3, and 4 separated by two annular grooves generally referred to be reference numerals 5 and 6. All of the parts described so far comprise a unitary molded elastomeric body which is made of a rubber-like material, such as one of the synthetic rubbers, or some other suitable plastic having elastomeric characteristics of a suitable character depending on the particular environment in which the swab is to be used. This type of swab is often supported on a tool mandrel (not shown), and therefore in many instances it is desirable to provide a hollow swab having a bore 1a extending all the way through the swab. In oil well swabs it is also desirable to have the swab body supported on a metal sleeve 7, as can best be seen in FIGS. 2 and 3.

There are three different angles mentioned in the objects of this invention, the first angle being the angle of the frustoconical side walls of the swabbing elements. This angle is measured with reference to the axis A of the cup, FIG. 3, or to a line parallel therewith, the angle being shown in FIG. 3 as the angle 10, which angle preferably lies in the range of ½–3 degrees. Another angle discussed is the angle of the upper wall of a groove and comprising the bottom wall of a swabbing element, this angle labeled 12 should preferably lie within a range of 45 to 60 degrees. Finally, there is the angle of the lower surface of a groove which is also the upper surface of a swabbing element, this angle being designated as the angle 14 and preferably lying within a range of 75 to 90 degrees. The depth of each groove into the resilient body as measured from the surface thereof should extend near enough to the sleeve 7 that the upper and lower swabbing elements separated by the groove function substantially individually, meaning that no significant quantity of rubber tries to flow from an upper swabbing element into the element located therebelow. On the other hand, it is important that sufficient thickness of rubber be left between the bottom of the groove and the surface of the sleeve 7, as illustrated by reference numeral 8 that there is no danger of the rubber separating and exposing the metal to corrosive action, etc.

If the angles, proportions and material of the cup are properly selected, when the swab is under working load, substantially the entire side walls of the swabbing elements located between the upper and lower extremes of the arrow 9 are moved out into frictional sealing contact with the inner surface of the pipe P. This fact has been amply demonstrated in a series of tests conducted with working models of this swab structure, which models when withdrawn from the oil well clearly show that the wear was distributed over the entire length of the side walls of the swabbing elements. The selection of rubber having durometer hardness in the range from 45 to 65 permits ample but not excessive flow of the rubber in the swabbing elements, and the omission from this swab of any swabbing elements which are short in the axial direction provides a structure which has better lift, and has better resistance to tearing as a result of contact with internal gaps of tool joints or with other obstructions. Where the axial length of the frustoconical surfaces 9' is greater than ⅓ the diameter of the swab, the swabbing elements will be sufficient to span gaps of the tool joints, and will have the strength to survive a number of strokes across such joints and other discontinuities. In the practical models tested in 2½ inch I.D. pipe, the diameters of the swab elements at their upper lips L was made 15 thousandths of an inch smaller than the nominal pipe diameter. After very extensive use in oil wells, it was found that wear had caused the swab diameter to decrease until it was between 50 thousandths and 125 thousandths smaller than the pipe diameter, and that this degree of wear occurred without tearing of the sealing elements, which, though badly worn, were still functioning in a reasonably satisfactory manner.

The present invention is not to be limited to the exact form shown in the drawing for obviously changes can be made therein within the scope of the following claims.

I claim:

1. A resilient swab structure comprising an elastomeric body of circular cross-section taken transversely of the axis of the swab, and said body including multiple mutually adjacent similar swabbing elements each of axial length greater than one-third the diameter of the swab and each having an upwardly and outwardly tapered frustoconical side wall making an angle in the range of ½–3 degrees with respect to said axis, and the elements being separated by annular grooves extending into the body by a distance which is less than one-quarter the diameter of the swab, the lower end of each swabbing element tapering into the bottom of the groove at an angle between 45 and 60 degrees with respect to said axis, and the upper end of each swabbing element falling into the bottom of the groove at an angle of 75 to 90 degrees with respect to said axis, and metal reinforcing means embedded in the body at a diameter near to but less than the bottoms of the grooves and extending the full length of the body.

2. In a swab structure as set forth in claim 1, said body comprising a rubber-like elastomer having a hardness of 45–65 durometer.

3. A resilient swab structure for swabbing out pipe of predetermined internal diameter comprising; a circular elastomeric body of outside diameter slightly less than said internal diameter and of axial length greater than said internal diameter, the body being divided into multiple substantially-identical swabbing elements by annular grooves recessed into the body to a depth which is small as compared with the axial length of each element, and each swabbing element having an upper rim comprising a sealing lip and having side walls tapering continuously inwardly and downwardly from said lip along a frustoconical surface whose length in the axial direction of the body is substantially greater than the maximum radius of the body.

4. A resilient swab structure for swabbing tubing within a well comprising; a circular elastomeric body of outside diameter slightly less than the internal diameter of the tubing and of axial length greater than said internal diameter, the body being divided into multiple similar swabbing elements by similar axially-spaced annular grooves recessed into the body, and each swabbing element having a rim at one end comprising a sealing lip and having side walls tapering from said lip inwardly along a frustoconical surface which extends in the axial direction at least twice the depth of a groove and makes an angle with respect to the axis of the swab in the range of ½ to 3 degrees.

5. A resilient swab structure comprising an elastomeric body of circular cross-section taken transversely of the axis of the swab, and said body including multiple mutually adjacent similar swabbing elements each having a continuous side wall which extends from one end of the element along any inwardly tapered frustoconical surface of axial length at least equal to one-third the diameter of the swab and making an angle in the range of ½–3 degrees with respect to said axis, and the elements being separated by annular grooves extending into the body by a distance which does not exceed 20% of said diameter.

6. A swab structure comprising a metal sleeve elongated in the direction of its axis and of predetermined outside diameter, and an elastomeric body bonded to said sleeve and having a maximum side-wall thickness not exceeding one-third of said diameter, said body having spaced annular grooves extending to a depth of at least half said thickness and dividing the body into plural similar axially-adjacent swabbing elements, each element having side walls tapering from one axial end of the element continuously inwardly at an angle not exceeding three degrees with said axis along a frustoconical surface extending in the axial direction at least twice the maximum wall thickness of the elastomeric body.

References Cited by the Examiner

UNITED STATES PATENTS

| | | | |
|---|---|---|---|
| 2,417,349 | 3/47 | Colbough | 103—225 |
| 2,633,808 | 4/53 | Webber | 103—125 |
| 2,671,413 | 3/54 | Young | 103—225 |
| 3,104,883 | 9/63 | English et al. | 277—212 X |

FOREIGN PATENTS 1,021,217   12/57   Germany.

EDWARD V. BENHAM, *Primary Examiner*.